US012166416B2

(12) United States Patent
Leong et al.

(10) Patent No.: US 12,166,416 B2
(45) Date of Patent: Dec. 10, 2024

(54) POWER SUPPLY AND POWER CONVERTER BOOSTER

(71) Applicant: Infineon Technologies Austria AG, Villach (AT)

(72) Inventors: Kenneth K. Leong, Villach (AT); Matthias J. Kasper, Villach (AT); Luca Peluso, Villach (AT); Darryl Tschirhart, Cambridge (CA)

(73) Assignees: Infineon Technologies Austria AG, Villach (AT); Cypress Semiconductor (Canada), Inc., Toronto (CA)

(*) Notice: Subject to any disclaimer, the term of this patent is extended or adjusted under 35 U.S.C. 154(b) by 582 days.

(21) Appl. No.: 17/485,920

(22) Filed: Sep. 27, 2021

(65) Prior Publication Data

US 2023/0095628 A1 Mar. 30, 2023

(51) Int. Cl.
*H02M 3/158* (2006.01)
*H02M 3/335* (2006.01)

(52) U.S. Cl.
CPC ....... *H02M 3/158* (2013.01); *H02M 3/33573* (2021.05)

(58) Field of Classification Search
CPC .......................... H02M 3/158; H02M 3/33573
See application file for complete search history.

(56) References Cited

U.S. PATENT DOCUMENTS

| 8,417,980 | B1 |  | 4/2013 | Mimberg |
|---|---|---|---|---|
| 10,804,798 | B1 | * | 10/2020 | Rizzolatti ......... H02M 3/33573 |
| 2017/0373592 | A1 | * | 12/2017 | Takahashi ............... H02M 3/07 |
| 2018/0138815 | A1 |  | 5/2018 | Yamada et al. |
| 2018/0152107 | A1 | * | 5/2018 | Childs ................. H02M 3/1584 |
| 2020/0350827 | A1 |  | 11/2020 | Ahmed et al. |
| 2020/0358355 | A1 | * | 11/2020 | Zambetti ............. H03K 17/693 |
| 2021/0119538 | A1 |  | 4/2021 | Leong et al. |

OTHER PUBLICATIONS

European Extended Search Report, EP 22 19 7667, Feb. 13, 2023, pp. 1-10.

* cited by examiner

*Primary Examiner* — Rafael O De Leon Domenech
(74) *Attorney, Agent, or Firm* — Armis IP Law, LLC

(57) ABSTRACT

A power supply includes a first (main) power converter and a second (auxiliary) power converter disposed in parallel with the first power converter to produce an output voltage to power a dynamic load. The second power converter includes a primary inductive path magnetically coupled to a secondary inductive path. A controller controls a flow of first current through the primary inductive path of the second power converter to control flow of second current supplied by the secondary inductive path to the dynamic load. During steady state conditions, the first power converter produces the output voltage while the second power converter is deactivated. During transient load conditions, the second power converter provides current boost capability to maintain a magnitude of the output voltage within a desired range.

28 Claims, 12 Drawing Sheets

POWER SUPPLY AND POWER CONVERTER BOOSTER

BACKGROUND

Conventional switching power supply circuits sometimes include an energy storage component such as an inductor to produce an output voltage that powers a load. For example, to maintain a magnitude of an output voltage within a desired range, a controller controls switching of input current through the inductor to produce the output voltage.

A drawback of an inductor-based power supply is the inability to input sufficient current into the inductor during changing load conditions (such as when the load instantaneously consumes more or less power) so that the output voltage stays within regulation.

For example, a load may operate in a steady state condition in which the load consumes a current of 10 Amperes in steady state and then suddenly switches over to consuming a much greater current of 100 Amperes. Conversely, the load may operate in a steady state condition in which the load consumes 100 Amperes in steady state and then suddenly switches over to consuming much less current of 10 Amperes. In either case, it is desirable that the output voltage of a power supply stay within a desired voltage range during these types of transient condition.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

This disclosure further includes the observation that conventional switching power supplies have a limited ability to maintain an output voltage within a desired range during transient load conditions. For example, conventional switching power supplies are limited as to how quickly they are able to switch from outputting 1 Amp (Amperes) to outputting 100 Amps (and vice versa). It is possible to modify parameters such as the input voltage and inductance of a respective switching power supply to accommodate a wide range of transient load conditions. However, such modifications can require a larger sized circuit components and reduce circuit efficiency of a respective power supply.

Embodiments herein provide novel and improved generation of an output voltage via a power supply that powers a load.

For example, in one embodiment, a power supply includes a first (main) power converter and a second power converter (auxiliary or boost power converter) disposed in parallel with the first power converter to produce an output voltage to power a dynamic load. The second power converter includes a primary inductive path magnetically coupled to a secondary inductive path. A controller controls a flow of first current through the primary inductive path of the second power converter. The control of the current through the primary inductive path in turn controls flow of second current supplied by the secondary inductive path to the dynamic load. During steady state conditions, the first power converter produces the output voltage while the second power converter is generally deactivated. During transient load consumption conditions, the second power converter provides current boost capability (positive or negative) to maintain a magnitude of the output voltage within a desired range.

The first power converter and the second power converter can be disposed at any suitable location with respect to each other and the dynamic load. However, in one embodiment, the second power converter over long time durations dissipates less heat than the first power converter. In such an instance, the second power converter is physically disposed nearer the dynamic load than the first power converter. This enables the dynamic load to dissipate any heat without overheating from heat generated by the second power converter (because it dissipates low heat) or first power converter (because it is further away from the dynamic load).

In further example embodiments, the second power converter and corresponding switch is deactivated to prevent flow of the second current through the secondary inductive path during non-transient dynamic load current consumption conditions; the second power converter is controlled to increase a magnitude of the second current supplied to the dynamic load during transient current consumption conditions.

Further embodiments herein include, via first switch circuitry in the power supply, controlling delivery of a magnitude of the first current through the primary inductive path; and via second switch circuitry, controlling delivery of the second current through the secondary inductive path. In one embodiment, the controller controls states of the first switch circuitry and the second switch circuitry based on comparison of the output voltage to a desired setpoint voltage.

In accordance with still further example embodiments, the power supply includes: i) a synchronous switch coupled to the secondary inductive path; the synchronous switch is operative to couple the secondary inductive path to a reference voltage; and ii) multiple switches coupled to the primary inductive path, the multiple switches operative to control a magnitude and direction of the current flow through the primary inductive path. A controller of the power supply: i) controls switches in the first power converter at a first switching frequency, and ii) controls switching of the multiple switches coupled to the primary inductive path at a second switching frequency to produce the output voltage. In one embodiment, the second switching frequency is greater than the first switching frequency enabling the second power converter to provide a faster response to transient conditions than the first power converter.

In yet further example embodiments, the power supply as discussed herein includes a first switch coupled to the primary inductive path; a comparator operative to generate an error voltage based on a difference between the output voltage and a setpoint reference voltage; and a controller operative to control a setting of the first switch and a magnitude of the first current through the primary inductive path based on the error voltage.

Further embodiments herein of the power supply as discussed herein include multiple switches coupled to the primary inductive path of the second power converter; as previously discussed, states of the multiple switches control a direction of the second current supplied through the secondary inductive path to the dynamic load.

The second power converter can be any suitable type of power converter such as a buck converter, LLC converter, switched-capacitor converter, etc. In one embodiment, the first power converter is a buck converter including one or more phases.

Still further embodiments herein include a controller that controls switches in the first power converter and the second power converter to regulate a magnitude of the output voltage that powers the dynamic load.

In one embodiment, the controller is further operative to: prior to detection of a transient power consumption condition associated with the dynamic load, prevent the second current from flowing through the secondary inductive path; and in response to detection of the transient power consumption condition associated with the dynamic load, temporarily increase a magnitude of the second current through the secondary inductive path to a non-zero value.

In still further example embodiments, the controller switches between: i) operation of the power supply in a first mode in which the first power converter produces the output voltage while a synchronous switch in the second power converter is deactivated (shut OFF or OPEN) to prevent the second current from flowing through the secondary inductive path to the dynamic load, and ii) operation of the power supply in a second mode in which the first power converter produces the output voltage while the synchronous switch is activated (turned ON or shorted) to supply the second current through the primary inductive path to the dynamic load.

In yet further example embodiments, the controller executes one or more modes such as: i) a first mode of stepping up and then ramping down a magnitude of the second current through the secondary inductive path to produce the output voltage and accommodate a transient increase in current consumed by the dynamic load, and i) a second mode of stepping down and then ramping up a magnitude of the second current flow through the secondary inductive path to produce the output voltage and accommodate a transient decrease in current consumed by the dynamic load. As previously discussed, the flow of current through the secondary inductive path is controlled via first current through the primary inductive path.

These and other more specific embodiments are disclosed in more detail below.

Note that any of the resources implemented in system as discussed herein can include one or more computerized devices, controllers, mobile communication devices, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to produce an output voltage. The instructions, when executed by computer processor hardware, cause the computer processor hardware (such as one or more co-located or disparately located processor devices or hardware) to: control operation of a first power converter to produce an output voltage; control operation of a second power converter to produce the output voltage, the second power converter disposed in parallel with the first power converter to produce the output voltage to power a dynamic load, the second power converter including a primary inductive path magnetically coupled to a secondary inductive path; and via control of first current through the primary inductive path, control flow of second current supplied by the secondary inductive path to the dynamic load.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to switching power supplies, the concepts disclosed herein may be advantageously applied to any other suitable topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
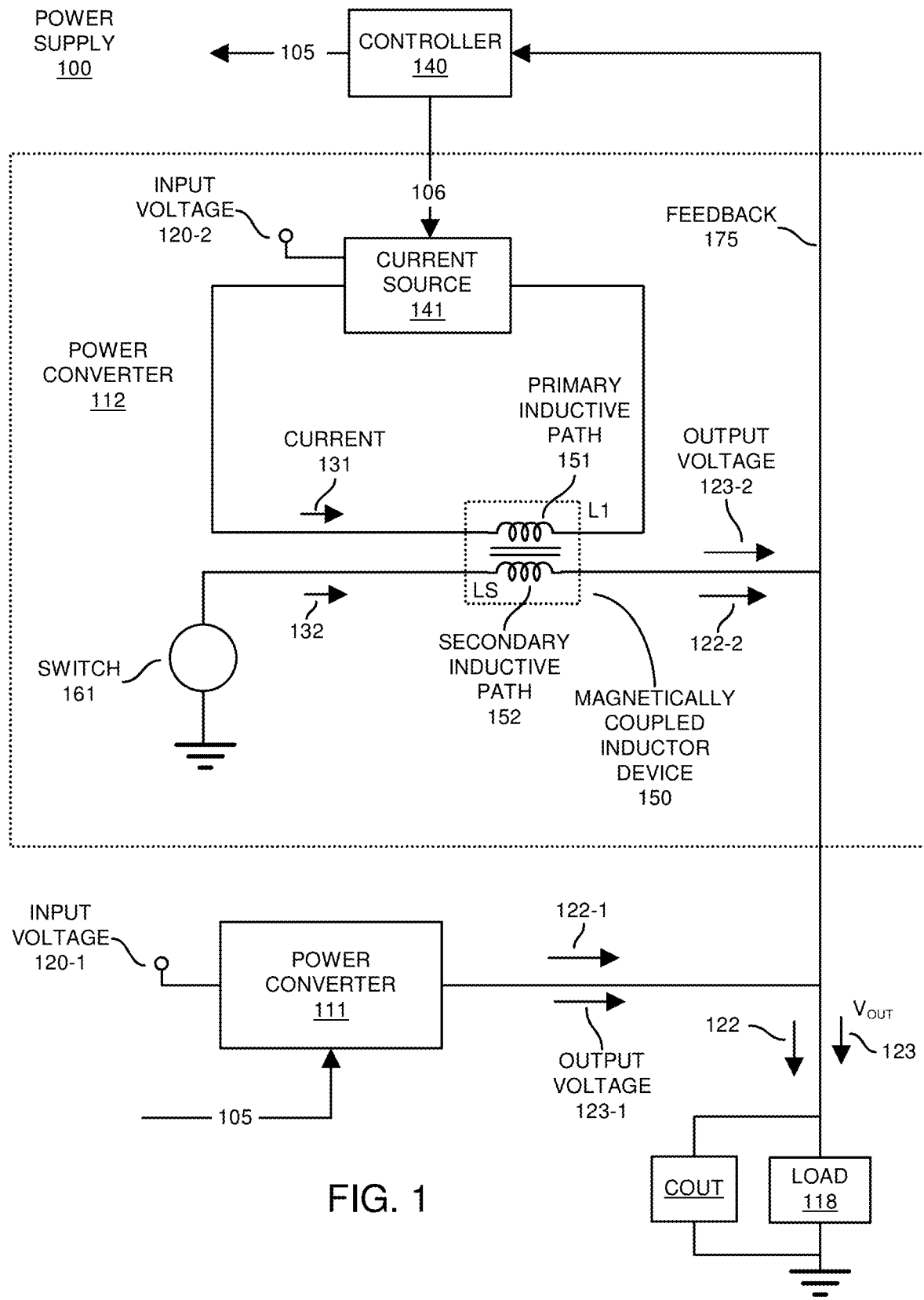
FIG. 1 is an example diagram illustrating a power supply including multiple power converters according to embodiments according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, a power supply includes a first (main) power converter and a second (auxiliary) power converter disposed in parallel with the first power converter to produce an output voltage to power a dynamic load. The second power converter includes a primary inductive path magnetically coupled to a secondary inductive path. A controller controls a flow of first current through the primary inductive path of the second power converter to control flow of second current supplied by the secondary inductive path to the dynamic load. During steady state and minor transient load current consumption conditions, the first power converter produces the output voltage while the second power converter is generally deactivated. During higher transient load current consumption conditions, such as above a threshold level, the second power converter provides supplemental current (positive or negative) via a current boost capability to maintain a magnitude of the output voltage within a desired range.

Now, with reference to the drawings, FIG. 1 is an example diagram illustrating a power supply including a primary power converter and a secondary power converter according to embodiments herein.

In this example embodiment, the power supply 100 produces output voltage 123-1 that powers the dynamic load 118 (such as one or more electronic circuits, components, etc.).

As shown, the power supply 100 includes multiple components such as a first power converter 111 (such as primary or main power converter), second power converter 112 (such as secondary or auxiliary power converter), and controller 140.

As its name suggests, the power converter 111 converts the input voltage 120-1 into the output voltage 123-1. Power converter 112 converts the input voltage 120-2 (or other input voltage) into the output voltage 123-2. Note that the input voltage 120-1 and input voltage 120-2 may be the same or different voltage (such as DC voltage).

Power converter 111 can be configured as any suitable circuit, logic, assembly, etc., that converts the received input voltage 120-1 (such as a DC or other suitable type voltage) into the output voltage 123-1 supplied to the dynamic load 118. As shown, the power converter 111 produces output voltage 123-1 supplied to the dynamic load 118; the output voltage 123-1 and power converter 111 supplies corresponding output current 122-1 to the dynamic load 118.

Additionally, power converter 112 can be configured as any suitable circuit, logic, assembly, etc., that converts the received input voltage 120-2 (such as a DC or other suitable type voltage) into the output voltage 123-2 supplied to the dynamic load 118. The output voltage 123 represents a contribution from output voltage 123-1 and output voltage 123-2.

In this example embodiment, the power converter 112 includes current source 141, magnetically coupled inductor device 150 (such as a transformer including one or more windings such as inductive paths). Magnetically coupled inductor device 150 (such as a transformer or other suitable device) includes primary inductive path 151 (such as a first or primary winding) and secondary inductive path 152 (such as a second secondary winding).

In general, controller 140 monitors the magnitude of the output voltage 123 supplied to the dynamic load 118 and produces respective control signals 105 and 106. Control signals 105 control operation of power converter 111; control signals 106 control operation of the power converter 112.

Because the power converter 111 and the power converter 112 operate in parallel, they both contribute over time (at the same or different times as discussed herein) to the generation of the output voltage 123. In one embodiment, the power converter 112 generally operates in a deactivated mode until boost current (positive or negative) is needed to maintain a magnitude of the output voltage 123 within a desired voltage range with respect to a setpoint reference voltage.

In accordance with further embodiments, during transient load conditions, such as the dynamic load 118 suddenly consumes extra current, the controller 140 operates (activates) both the power converter 111 and the power converter 112 to produce the output voltage 123 that powers the dynamic load 118.

Thus, in one embodiment, power supply 100 includes a first (main) power converter 111 and a second (auxiliary or boost) power converter 112 disposed in parallel with the first power converter 111 to collectively produce an output voltage 123 to power a dynamic load 118 depending on current operating conditions. The second power converter 112 includes a primary inductive path 151 (having inductance L1) magnetically coupled to a secondary inductive path 152 (having inductance LS).

As further discussed herein, the controller 140 controls a flow of first current 131 through the primary inductive path of the second power converter 112 to control flow of second current 132 (such as controls its magnitude and direction or output current 122-2) supplied by the secondary inductive path 152 to the dynamic load 118. A positive direction of output current 122-2 causes corresponding current to flow from the secondary inductive path 152 to the dynamic load 118 and output capacitor COUT. A negative direction of output current 122-2 causes corresponding current to flow from the dynamic load 118, output capacitor COUT, and/or output current 122-1 to flow through the secondary inductive path 152 and switch 161 to ground.

For example, during steady state conditions, when the total output current 122 consumed by the dynamic load 118 is fairly constant (during no-transient conditions), the first power converter 111 produces the output voltage 123 while the second power converter 112 is deactivated. However, during transient load conditions, when the there is a sudden change in current consumption by the dynamic load 118, in addition to operating power converter 111 to produce the output current 122-1, the controller 140 controls the second power converter 112 to provide supplemental current 122-2 (such as based on current boost capability) to maintain a magnitude of the output voltage 123 within a desired range or at a desired setpoint reference voltage.

As further shown, the power converter 112 includes switch 161 disposed in series with the secondary inductive path 152 of the magnetically coupled inductor device 150. As further discussed herein, when the supplemental output current 122-2 is needed to maintain the magnitude of the output voltage 123 at a desired setpoint voltage value, the controller 140 activates the switch 161 (such as a synchronous switch) to an ON state, connecting the secondary inductive path 152 (such as transformer winding of magnetically coupled inductor device 150) to ground.

As previously discussed, when the switch 161 is activated during a respective transient current consumption condition, the controller 140 additionally controls a magnitude and direction of current 131 through the primary inductive path 151. Flow of current 131 results in generation of the output current 122-2 (positive or negative) as needed.

In further example embodiments, the second power converter 112 is deactivated to prevent flow of the first current 131 through the primary inductive path 151 (which prevents second current 122-1 flow through the secondary inductive path 152) during non-transient dynamic load current consumption conditions. Conversely, as previously discussed, the second power converter 112 is controlled to increase a magnitude of the second current 122-2 supplied to the dynamic load 118 during transient current consumption conditions.

Further, as previously discussed, the controller 140 receives one or more feedback parameters associated with the output voltage 123.

For example, the controller 140 can be configured to receive feedback 175 such as the output voltage 123 itself or other one or more parameter values indicative of a transient current condition. Note that the controller 140 can be configured to receive additional feedback such as an amount of current supplied by the output voltage 123 (through primary inductive path 151) to the load 118, etc., to determine a transient condition and when to activate the power converter 112.

In accordance with still further embodiments, as previously discussed, the controller 140 monitors feedback 175 (such as a magnitude of the output voltage 123, current consumed by load 118, etc.) and, based on such one or more monitored parameters, controls delivery of the input current 131 to the primary inductive path 151 and, thus, output current 122-2 through the secondary inductive path 152 to the dynamic load 118.

More specifically, in one embodiment, when the controller 140 determines that output current 122-1 does not change fast enough to maintain the output voltage 123 within a desired voltage range, the controller 140 activates the switch 161 and controls a flow of current 131, resulting in non-zero output current 122-2 through the secondary inductive path 152 to contribute additional current to the dynamic load 118.

Figure 2:
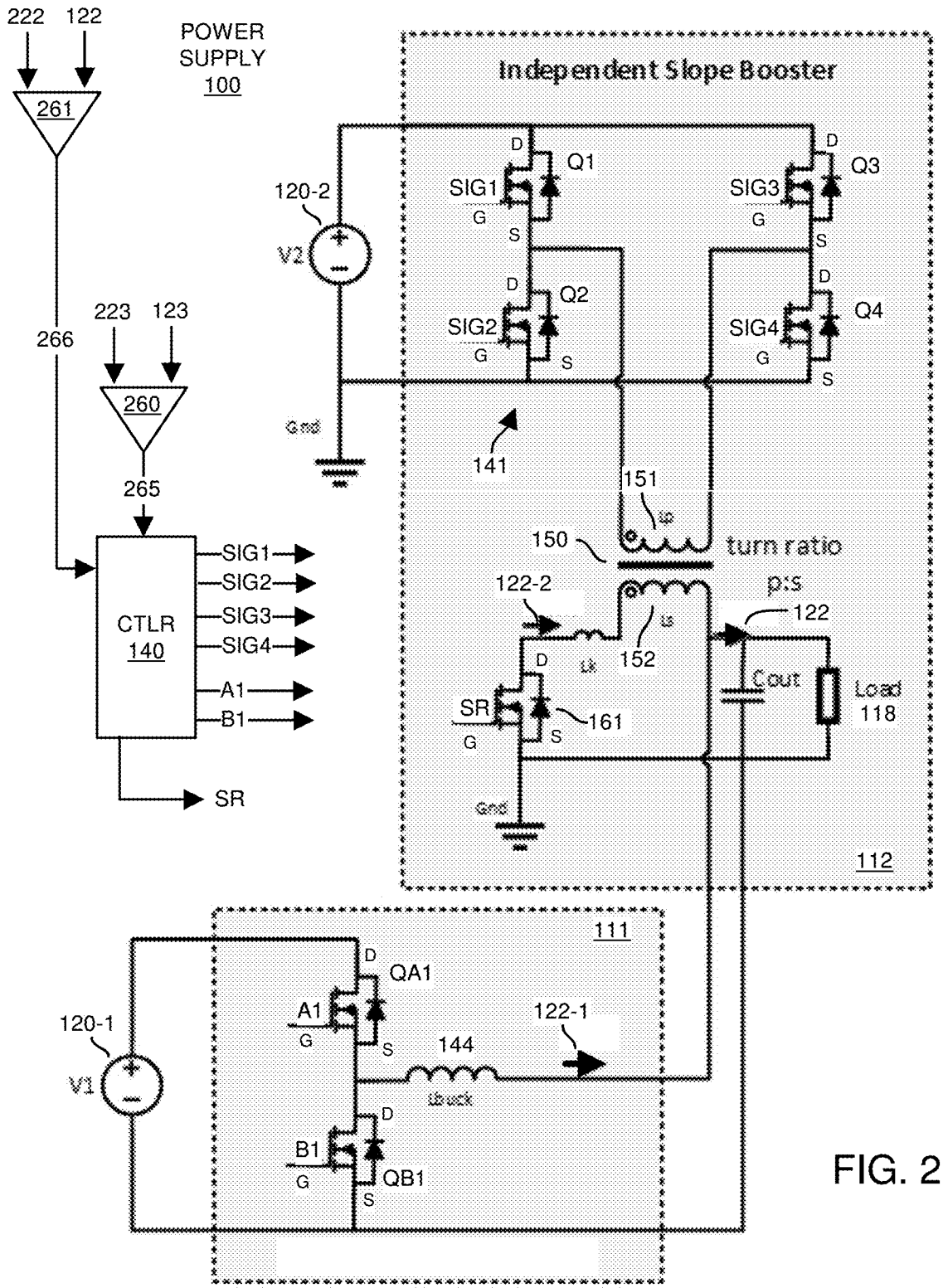
FIG. 2 is an example diagram illustrating implementation of a primary (main) power converter and a secondary (auxiliary) power converter according to embodiments herein.

FIG. 2 is an example diagram illustrating details of a power supply according to embodiments herein.

An example of a power converter 112 (such as i-Slope Booster) in parallel with power converter 111 (such as one or more buck power converter phases in parallel) is shown in FIG. 2.

In one embodiment, the power converter 112 includes a full bridge circuit coupled to the primary side (such as primary inductive path 151) of the magnetically coupled inductor device 150 (a.k.a., transformer), with a fixed turn ratio and Vin that can be any value selected for the application. Alternatively, note that a half-bridge version including a capacitor leg is possible.

Further in this example embodiment, the secondary side (secondary inductive path 152) of the magnetically coupled inductor device 150 connects to switch 161 (such as a synchronous or SR switch).

As further shown, and as previously discussed, the power converter 111 is disposed in parallel with the power converter 112 to produce the respective output voltage 123. The power converter 111 generally provides DC or low frequency current 122-1 to the dynamic load 118 since the power converter 112 provides additional positive or negative transient current 122-2 to the dynamic load 118.

The inductor 144 (a.k.a., Lbuck) of power converter 111 can be fairly high in value and can have a low current ripple which reduces core loss. Furthermore, the power converter 111 (such as buck stage) switches at a lower frequency and therefore further reduce switching losses. The power converter 111 (such as buck converter) also can be disposed physically further away from the load 118 (power converter 112 disposed closer to the dynamic load 118) without affecting the transient response as well as reducing the number of capacitors (associated with capacitance Cout) at the load 118.

More specifically, in this example embodiment, as shown, the power converter 111 of power supply 100 includes switch QA1, switch QB1, and inductor 144. Note that the power supply 100 can include any number of phases (similar to power converter 111) disposed in parallel to produce the output voltage 123-1. The voltage source 120-1 supplies voltage V1 (such as 6 VDC or any suitable voltage) to the series combination of switch QA1 (such as a high-side switch) and switch QB1 (such as a low-side switch). As known in buck converter control, via control signals A1 and B1, the controller 140 switches between activating the switch QA1 and switch QB1 to generate the output voltage 123-1 from the power converter 111.

Note that any of the switches as discussed herein can be implemented in any suitable manner. In one embodiment, one or more of the switches as discussed herein are implemented via so-called field effect transistors.

Further in this example embodiment, note that the combination of switch 161, leak inductor Lk, and secondary inductive path 152 are disposed in series between ground and the dynamic load 118.

Yet further in this example embodiment, the drain node of switch QA1 is connected to receive voltage V1 provided by voltage source 120-1. The source node of switch QA1 is coupled to the drain node of switch QB1 as well as the input node of the inductor 144. The source node of switch QB1 is coupled to ground. The output node of the inductor is coupled to the load 118.

As previously discussed, during operation, controller 140 produces control signals 105 (such as control signal A1 and control signal B1) to control states of switches QA1 and QB1. For example, the control signal A1 produced by the controller 140 drives and controls the gate node of switch QA1; the control signal B1 produced by the controller 140 drives and controls the gate node of switch QB1.

Further in this example embodiment, the current source 141 with respect to primary inductive path 151 includes switches Q1, Q2, Q3, and Q4.

The voltage source 120-2 supplies voltage V2 (such as 12 VDC or any suitable voltage) to the full bridge arrangement of switches Q1, Q2, Q3, and Q4. The first series combination of switch Q1 and switch Q2 is disposed in parallel with the second series combination of switch Q3 and switch Q4.

As further shown, the drain node of switch Q1 is connected to receive voltage V2 provided by voltage source 120-2. The source node of switch Q1 is coupled to the drain node of switch Q2 as well as the first terminal of the primary inductive path 151 (winding Lp). The source node of switch Q2 is coupled to ground.

As further shown, the drain node of switch Q3 is connected to receive voltage V2 provided by voltage source 120-2. The source node of switch Q3 is coupled to the drain node of switch Q4 as well as the second terminal of the primary inductive path 151 (Lp). The source node of switch Q4 is coupled to ground.

During operation, controller 140 produces control signals 106 (such as control signal SIG1, control signal SIG2, control signal SIG3, and control signal SIG4). The control signal SIG1 controls the gate (G) of switch Q1; the control signal SIG2 controls the gate (G) of switch Q2; the control signal SIG3 controls the gate (G) of switch Q3; the control signal SIG4 controls the gate (G) of switch Q4. In this example embodiment, logic high voltage applied to a gate turns a respective switch ON. Logic low voltage applied to a gate turns a respective switch OFF.

In yet further example embodiments, the power supply 100 as discussed herein includes a switch 161 coupled to the secondary inductive path 152; a difference amplifier or comparator 260 generates an error voltage 265 based on a difference between a magnitude of the output voltage 123 and a setpoint reference voltage 223 (such as 0.75 VDC). The controller 140 controls settings of the switch 161, and magnitude of the current 131 (and thus output current 122-2) based on the error voltage 265 or other suitable monitored feedback parameter.

Additionally, or alternatively, the power supply 100 as discussed herein can be configured to implement current control with or without voltage control as previously discussed. For example, in one embodiment, the power supply 100 includes a difference amplifier or comparator 261 that generates an error current signal 266 based on a difference between a magnitude of the output current 122 and a setpoint reference current 222. The controller 140 controls settings of the switch 161, and magnitude of the current 131 (and thus output current 122-2) based on the error current signal 266 or other suitable monitored feedback parameter.

As previously discussed, the first power converter 111 and the second power converter 112 can be disposed at any suitable location with respect to each other on a circuit board and the dynamic load 118. However, in one embodiment, the second power converter 112 dissipates less heat over long periods of time than the first power converter 111. In such an instance, embodiments herein include physically disposing the second power converter 112 nearer the dynamic load 118 than the first power converter 111. This enables the dynamic load 118 to dissipate any heat without overheating from heat generated by the second power converter 112 (because it generates low heat) or the first power converter 111 (because it's further away). An example is shown in FIGS. 12A and 12B in which the power converter 112 is disposed nearer the load 118 than the power converter 111.

Figure 12A:
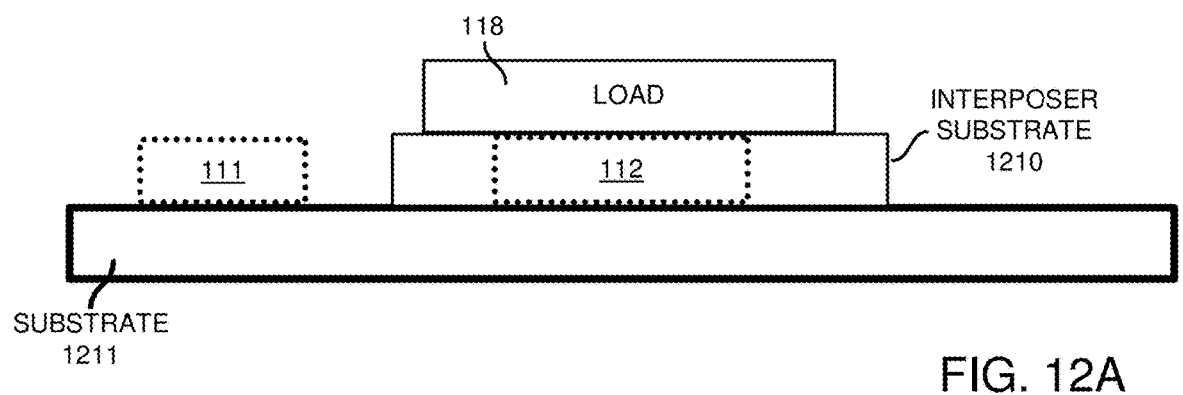
FIG. 12A is an example diagram illustrating assembly of multiple power converters in an interposer layer according to embodiments herein.
Figure 12B:
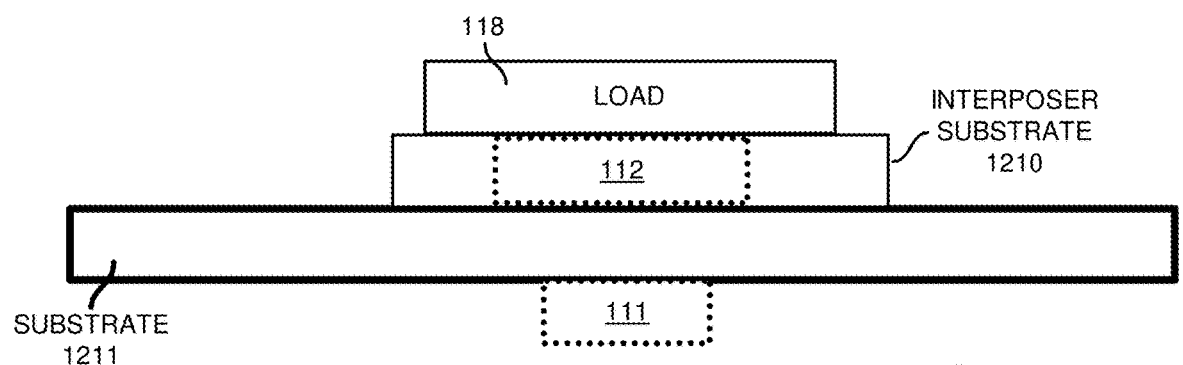
FIG. 12B is an example diagram illustrating assembly of multiple power converters in an interposer layer according to embodiments herein.

FIG. 12A is an example diagram illustrating assembly of multiple power converters in an interposer layer according to embodiments herein.

In this example embodiment, the first power converter 111 and the second power converter 112 are disposed at different distances with respect to the dynamic load 118. For example, in one embodiment, the second power converter 112 is disposed closer to the load 118 than the first power converter 111 as shown in FIG. 12A.

More specifically, in one embodiment, the power supply 100 includes a respective interposer substrate 1210. The power converter 112 is disposed near dynamic load 118 such as beneath it. Power converter 111 is disposed on substrate 1211 (such as a motherboard) at a distance away from the dynamic load 118 and power converter 112 is disposed in interposer substrate 1210. Such a configuration is desirable because, in one embodiment, the dynamic load 118 dissipates substantial heat; the power converter 112 provides power during transient conditions resulting in dissipation of a lesser amount of heat with respect to the heat generated by the power converter 111 for steady state power. In other words, in one embodiment, the power converter 111 supplies a majority of power to the dynamic load 118, resulting in relatively little heat generated by the power converter 112. Thus, because the heat generated by the power converter 112 is low, the substrate 1210 is able to more easily dissipate the heat generated by the load 118.

FIG. 12B is an example diagram illustrating assembly of multiple power converters in an interposer layer according to embodiments herein.

In this example embodiment, the power converter 112 is disposed in interposer substrate 1210 between the load 118 and the substrate 1211. The power converter 111 is disposed on a surface of the substrate 1211 opposite the interposer substrate 1210.

Figure 3:
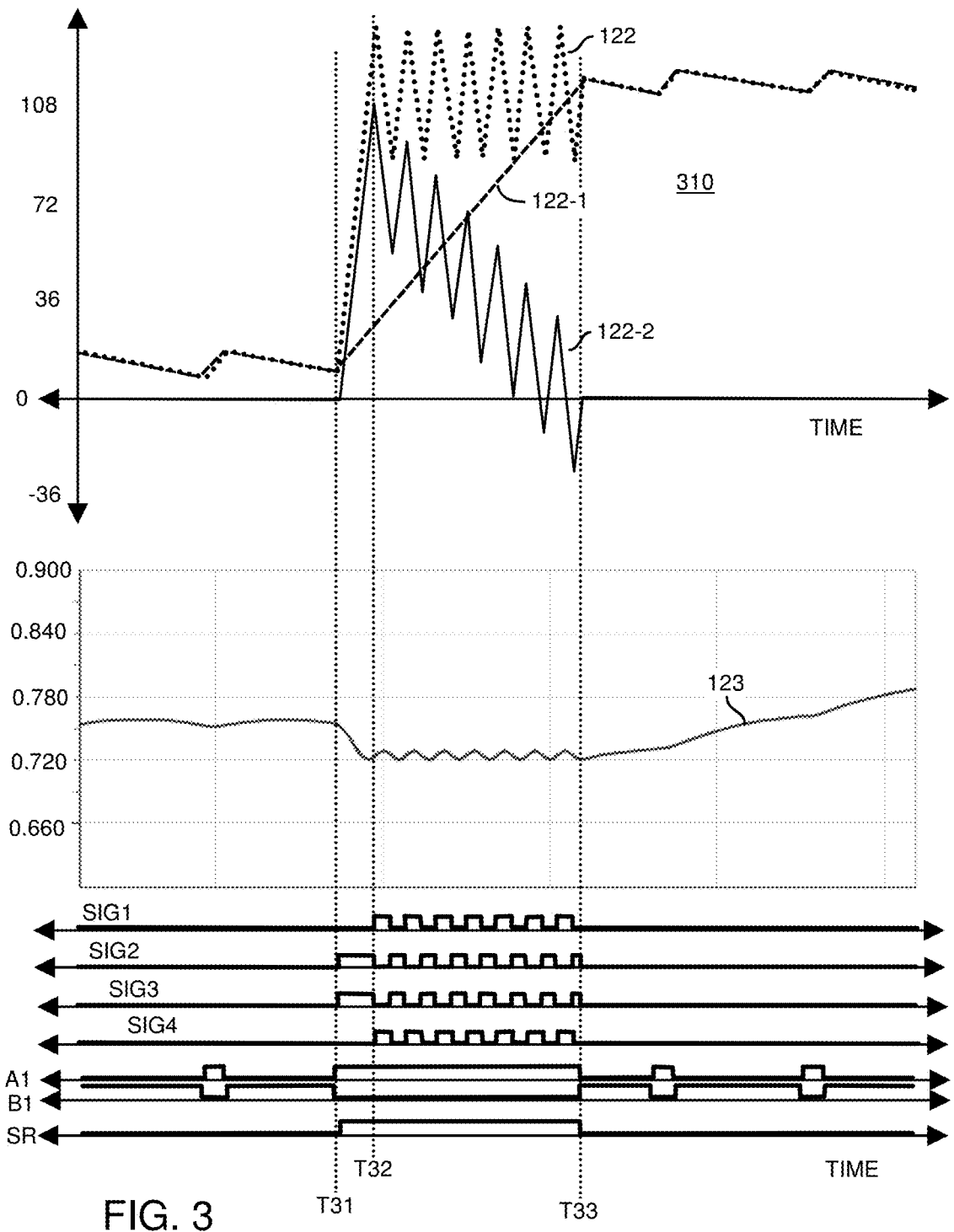
FIG. 3 is an example diagram illustrating a timing diagram of controlling multiple power converters to produce an output voltage and corresponding current flow according to embodiments herein.

FIG. 3 is an example diagram illustrating a timing diagram of controlling multiple power converters to produce an output voltage and corresponding current flow according to embodiments herein.

Simulation of an example of a transient step up event is shown in FIG. 3 based on the following parameters:
Istart output current 122=12.5 A
Iend output current 122=112.5 A
V1=6VDC
V2=12VDC
Vout=~0.75VDC
Lbuck (inductor 144)=100 nH
ratio of primary winding (primary inductive path) to secondary winding (secondary inductive path)=p:s=1:1
Lk=30 nH
Buck freq of power converter 111=800 kHz
i-Slope Booster switching freq of power converter 112=4 MHz In this example embodiment, the graph 310 of FIG. 3 shows waveforms of signals during ramp up mode. The top portion of graph 310 shows the various output currents supplied by the power converters to the dynamic load 118, the middle portion of graph 310 shows the output voltage waveform (output voltage 123), and the bottom portion of graph 310 shows the gate signals controlling respective switches in the power converters to produce respective output currents.

Further in this example embodiment, note that the current 122-2 from the secondary inductive path 152 of the power converter 112 does not affect the output current 122-1 of the power converter 111 (such as Buck converter), since they are independent circuitry.

Further in this example embodiment, the power converter 112 is activated only during load change transitions (such as between time T31 and time T32) when it is needed to maintain regulation of the output voltage 123. During steady state operation, such as when the conveyance of output current 122-1 from power converter 111 supplies sufficient current to the load 118 to maintain the output voltage 123 within regulation, only the power converter 111 (such as switches QA1, QB1) is operational. This is shown in the periods before time T31 and after time T33 in graph 310.

Assume in this example embodiment that the dynamic load 118 experiences a sudden increase in current consumption (output current 122) at time T31. This causes a magnitude of the output voltage 123 to drop substantially such as 30-40 millivolts (or other suitable amount) within a short amount of time around time T31. As previously discussed, the controller 140 monitors and detects this condition (such as based on a magnitude of the output voltage 123, slope of the output voltage 123, etc.). In response to the sudden increase in current consumption (or voltage drop), the controller 140 activates the power converter 112 to provide output current 122-2. This includes, at or around time T31, activating the switch 161 to an ON state.

Additionally, note that the controller 140 activates the high side switch circuitry QA1 to an ON state between time T31 and time T33 while low side switch circuitry QB1 is deactivated.

As previously discussed, while the switch 161 is activated between time T31 and time T33, the controller 140 provides extra output current 122-2 to the load 118 via switching the switches Q1-Q4 as shown in FIG. 3. The switching of the switches Q1-Q4 between T31 and T32 as shown in graph 310 causes the power supply 100 to operate in a first mode of stepping up the output current 122-2 (to prevent the output voltage 123 from dropping further) and then ramping down a magnitude of the output current 122-2 through the secondary inductive path 152 to the dynamic load 118 between time T32 and T33 since the power converter 111 eventually is able to supply all of the output current required by the dynamic load 118 by time T33. Thus, the burst of output current 122-2 between time T31 and time T33 maintains a magnitude of the output voltage 123 during the transient current power consumption by the load 118.

In further example embodiments, as shown in graph 310, note that the controller 140 controls switches QA1 and QB1 in the power converter 111 at a first switching frequency; the controller 140 controls switching of multiple switches Q1-Q4 coupled to the primary inductive path 151 at a second switching frequency to produce the output current 122-2 and corresponding output voltage 123-2 on an as-needed basis. In one embodiment, the second switching frequency of operating the power converter 112 (and corresponding ON-OFF pulses associated with signals SIG1, SIG2, SIG3, etc.) is substantially greater (such as 25% or more greater) than the first switching frequency of signals A1 and B1. Operation of the of the power converter 112 at the higher switching when it is needed during time T31 and T33 ensures high responsivity to prevent the output voltage 123 from falling out of regulation.

At or around time T33, note that the power converter 112 no longer needs to be in an ON state to provide output current 122-2 to the dynamic load 118 because the power converter 111 provides a sufficient magnitude of the output current 122 to the dynamic load 118. Accordingly, the controller 140 deactivates the power converter 112 at or around time T33. This includes deactivating switch 161 and preventing flow of current 131 through the primary inductive path 151. As previously discussed, this prevents or terminates flow of output current 122-2. Current source 131 and corresponding switches are also deactivated.

Figure 4:
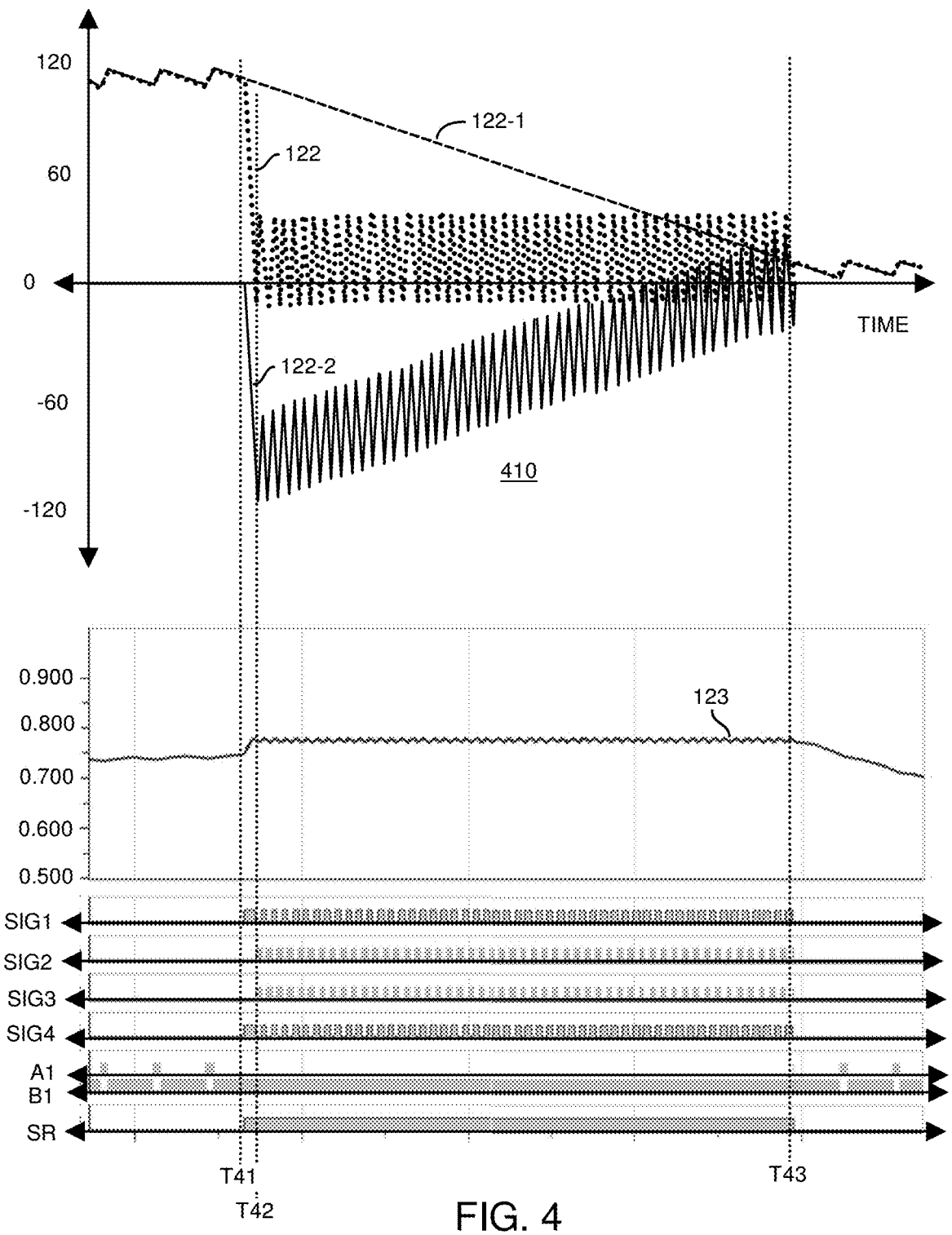
FIG. 4 is an example diagram illustrating a timing diagram of controlling multiple power converters to produce an output voltage and corresponding current flow according to embodiments herein.

FIG. 4 is an example diagram illustrating a timing diagram of controlling multiple power converters to produce an output voltage and corresponding current flow according to embodiments herein.

Simulation of an example of a transient step down event is shown in FIG. 4 based on the following parameters:
Istart of output current 122=112.5 A
Iend of output current 122=12.5 A In this example embodiment, the graph 410 of FIG. 4 shows waveforms of signals during ramp down mode of output current 122-1. The top portion of graph 410 shows the various output currents supplied by the power converters to the dynamic load 118, the middle portion of graph 410 shows the output voltage waveform (output voltage 123), and the bottom portion of graph 410 shows the gate signals controlling respective switches in the power converters to produce respective output currents.

In this example embodiment, note that the output current 122-2 current from the i-Slope Booster (power converter 112) does not affect the output current 122-1 of the power converter 111 (such as Buck converter) since they are independent circuitry.

Further in this example embodiment, the power converter 112 is activated only during load change transitions when it is needed to maintain regulation of the output voltage 123. During steady state operation, such as when the conveyance of output current 122-1 from power converter 111 supplies sufficient current to the load 118 to maintain the output voltage 123 within regulation, only the power converter 111 (and corresponding switches QA1, QB1) is operational. This is shown in the periods before time T41 and after time T43 in graph 410.

Assume in this example embodiment that the dynamic load 118 experiences a sudden decrease in current consumption at or around time T41. This causes a magnitude of the output voltage 123 to increase substantially such as 30-40 millivolts or other amount within a short amount of time around time T41. As previously discussed, the controller 140 monitors and detects this condition (such as based on a magnitude of the output voltage 123, slope of the output voltage 123, etc.). In response to the sudden decrease in current consumption (or voltage step), the controller 140 activates the power converter 112. This includes, at or around time T41, activating the switch 161 to an ON state. Additionally, the controller 140 activates the low side switch circuitry QB1 to an ON state between time T41 and time T43 while high side switch circuitry QA1 is deactivated.

While the switch 161 is activated between time T41 and time T43, the controller 140 provides extra negative output current 122-2 to the load 118 via switching the switches Q1-Q4 as shown in FIG. 4. The switching of the switches Q1-Q4 between T41 and T43 causes the power supply 100 to operate in a mode of stepping down the output current 122-2 (to prevent the output voltage 123 from increasing further) between time T41 and T42 and then ramping up a magnitude of the output current 122-2 through the secondary inductive path 152 between time T42 and T43 to the dynamic load 118 since the power converter 111 eventually is able to supply the output current required by the dynamic load 118 by time T43. Thus, the burst of negative output current 122-2 between time T41 and time T43 maintains a magnitude of the output voltage 123 during the transient current power consumption by the load 118.

In further example embodiments, note that the controller 140 controls switches QA1 and QB1 in the power converter 111 at a first switching frequency; the controller 140 controls switching of multiple switches Q1-Q4 between time T41 and T43 at a second switching frequency to produce the negative output current 122-2 and corresponding output voltage 123-2 on an as-needed basis. In one embodiment, the second switching frequency of operating the power converter 112 is substantially greater (such as 25% or more greater) than the first switching frequency. Operation of the of the power converter 112 at the higher switching when it is needed as previously discussed ensures high responsivity to prevent the output voltage 123 from going out of regulation.

At or around time T43, the power converter 112 is no longer needed to provide negative output current 122-2 to the dynamic load 118. Accordingly, the controller 140 deactivates the power converter 112. This includes deactivating switch 161 and preventing flow of current 131 through the primary inductive path 151. As previously discussed, this prevents or terminates flow of output current 122-2.

Figure 5:
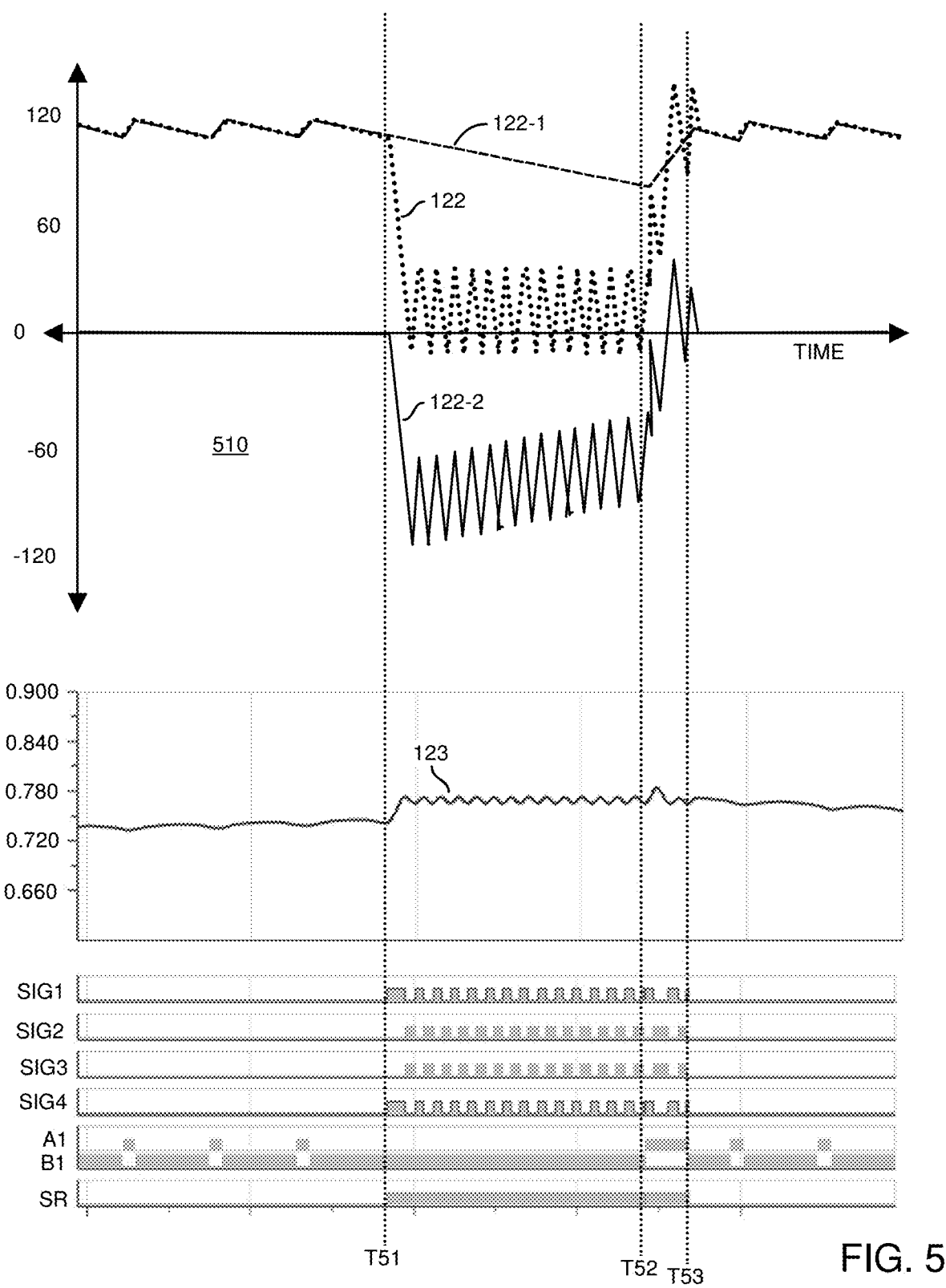
FIG. 5 is an example diagram illustrating a timing diagram of controlling multiple power converters to produce an output voltage and corresponding current flow according to embodiments herein.

FIG. 5 is an example diagram illustrating a timing diagram of controlling multiple power converters to produce an output voltage and corresponding current flow according to embodiments herein.

Simulation of an example of a transient step down and up event is shown in FIG. 5 based on the following parameters:
Istart of output current 122 at time T51=112.5 A
Istep of output current 122 between time T51 and T52=12.5 A
Iend of output current after time T53=112.5 A
All other parameters are the same as the previous cases of FIG. 3 and FIG. 4.

In a similar manner as previously discussed with respect to FIG. 4, with reference to FIG. 5, the controller 140 detects a transient decrease in current consumption by the dynamic load 118 at or around time T51. In such an instance, the controller 140 activates the switch 161 via signal SR set to a logic high. Additionally, the controller 140 produces the output current 122-2 from power converter 112 to be negative to reduce the overall amount of output current 122 supplied to the dynamic load 118.

At or around time T52, the controller 140 detects a transient increase in current consumption by the dynamic load 118. In such an instance, the controller 140 temporarily increases or ramps a magnitude of the output current 122-2 from power converter 112 between time T52 and T53 such that the summation of output current 122-2 from the power converter 112 and the output current 122-1 from power converter 111 equals the amount of output current 122 consumed by the dynamic load 118.

After time T53, the power converter 112 is deactivated while the power converter 111 provides the output current 122 to the dynamic load 118.

Figure 6:
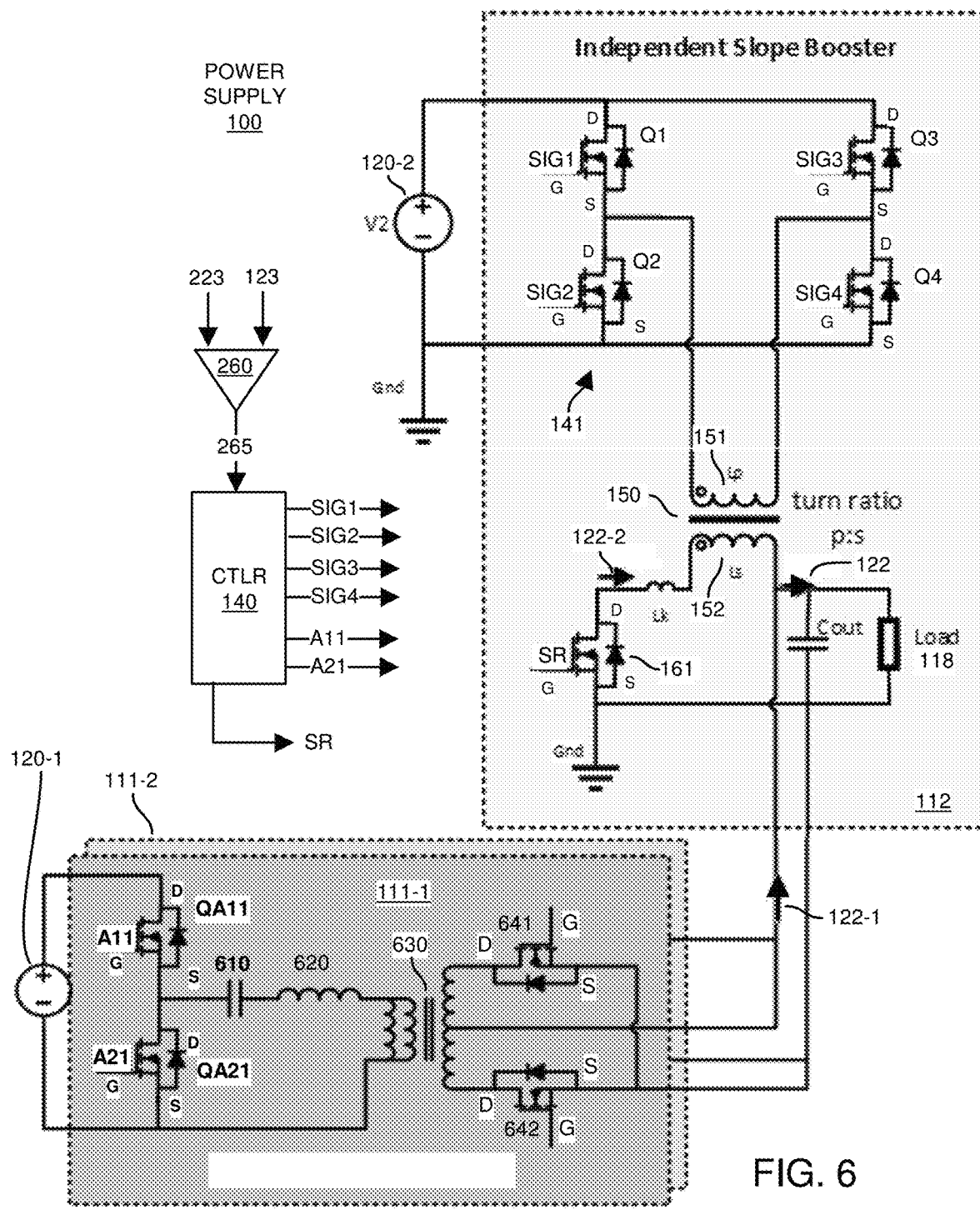
FIG. 6 is an example diagram illustrating implementation of a primary power converter and a secondary power converter according to embodiments herein.

FIG. 6 is an example diagram illustrating implementation of a primary power converter and a secondary power converter according to embodiments herein.

A second example is an i-Slope Booster in parallel with multi-phase LLC converter 111-1, 111-2, etc., is shown in FIG. 6. The LLC converter 111-1 is in parallel to the i-Slope Booster (power converter 112) and is only required to handle the DC current supply. In one embodiment, the power converter operates at a resonant point, fixed frequency, unregulated conversion gain and maximum efficiency. Furthermore, the power converter 111-1 can be configured to achieve ZVS for all the primary side switches and ZCS for the secondary side switches. It can provide isolation and with a fix voltage ratio which means V1 could theoretically be any value. Here, the assumption is that the input voltage will be regulated by another pre-stage to follow the load, but this can be a much slower response. In this example embodiment, the power converter 111-1 such as a half bridge LLC (including capacitor 610, inductor 620, etc.) with center tapped transformer 630 for the secondary side is one example given here, other resonant topology with or without isolation can also be used here, for example, switch cap based topologies or other hybrid concepts with regulation that can be slower compare to the transient load change. Switches QA11, QA12, 641, 642 control operation of the power converter 111-1 to convert the input voltage 120-1 into the output current 122-1 supplied to the dynamic load 118.

An example of a power converter 112 (such as i-Slope Booster) in parallel with power converter 111-1, 111-2, etc., (such as one or more LLC power converter phases in parallel) is shown in FIG. 6. Details of power converter 112 were previously discussed in FIG. 2.

In a similar manner as previously discussed, the first power converter 111-1 and the second power converter 112 can be disposed at any suitable location with respect to each other on a circuit board and the dynamic load 118. However, in one embodiment, the second power converter 118 dissipates less heat over long periods of time than the first power converter 111. In such an instance, embodiments herein include physically disposing the second power converter 112 nearer the dynamic load 118 than the first power converter 111. This enables the dynamic load 118 to dissipate any heat without overheating from heat generated by the second power converter 112 (because it generates low heat) or the first power converter 111 (because its further away).

Figure 7:
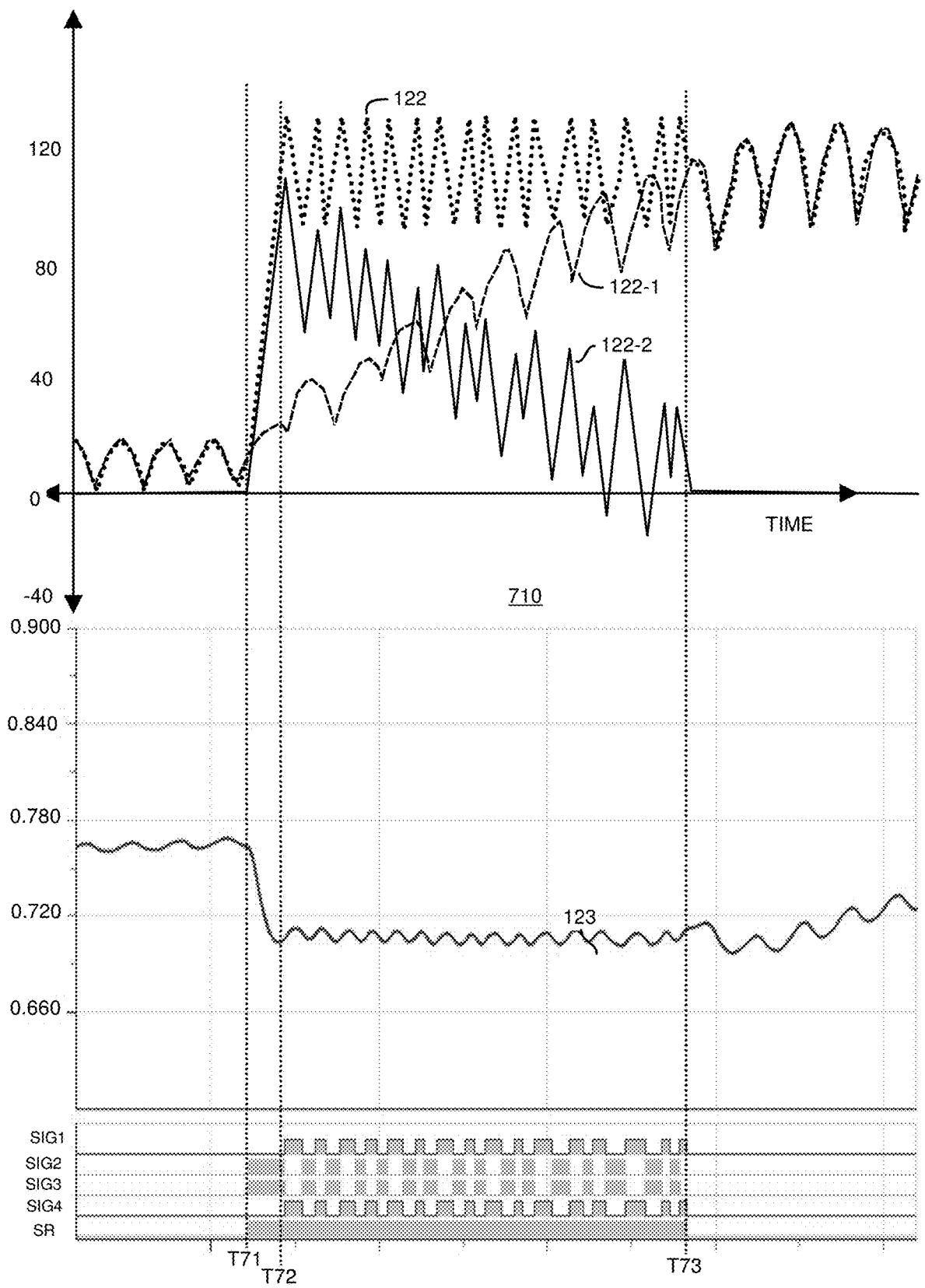
FIG. 7 is an example diagram illustrating a timing diagram of controlling multiple power converters to produce an output voltage and corresponding current flow according to embodiments herein.

FIG. 7 is an example diagram illustrating a timing diagram of controlling multiple power converters to produce an output voltage and corresponding current flow according to embodiments herein.

Simulation of an example of a transient step up event is shown in FIG. 7, based on the following parameters:
Istart of output current 122=12.5 A
Iend of output current 122=112.5 A
V1=48VDC
V2=12VDC
Vout=~0.75VDC
p:s=1:1
Lk=40 nH
1Φ LLC freq=500 kHz
Effective 2Φ output LLC freq=1 MHz
i-Slope Booster freq=~4 MHz Other parametric values are possible, selection simply depends on the application requirements. The waveform (such as I_LLC) as indicated by output current 122 shows the output current of the 2Φ LLC and its ramp up during the load change. The waveform (I_LS) as indicated by output current 122-2 is the current injected by the power converter 112 on the secondary side of the transformer through the SR switch 161 into the load 118. The output current 122-1 and output current 122-2 current sum up together (I_out) as indicated by output current 122, which has a much steeper slope during ramp up. The control of the i-Slope Booster (power converter 112) here ensures the that the injected current does not take over the entire I_out current too quickly, otherwise the power converter 111-1 would see a high impedance and stop transferring power entirely.

In this example embodiment, the graph 710 of FIG. 7 shows waveforms of signals during ramp up mode. The top portion of graph 710 shows the various output currents supplied by the power converters to the dynamic load 118, the middle portion of graph 710 shows the output voltage waveform (output voltage 123), and the bottom portion of graph 710 shows the gate signals controlling respective switches in the power converters to produce respective output currents.

Further in this example embodiment, note that the current 122-2 from the secondary inductive path 152 of the power converter 112 does not affect the output current 122-1 of the power converter 111-1 (such as LLC converter or other suitable entity), since they are independent circuitry.

Yet further in this example embodiment, the power converter 112 is activated only during load change transitions (such as between time T71 and time T72) when it is needed to maintain regulation of the output voltage 123. During steady state operation, such as when the conveyance of output current 122-1 from power converter 111 supplies sufficient current to the load 118 to maintain the output voltage 123 within regulation, only the power converter 111-1 is operational. This is shown in the periods before time T71 and after time T73 in graph 710.

Assume in this example embodiment that the dynamic load 118 experiences a sudden increase in current consumption (output current 122) at time T71. This causes a magnitude of the output voltage 123 to drop substantially such as 30-40 millivolts (or other amount) within a short amount of time around time T71. As previously discussed, the controller 140 monitors and detects this condition (such as based on a magnitude of the output voltage 123, slope of the output voltage 123, etc.). In response to the sudden increase in current consumption (or voltage drop), the controller 140 activates the power converter 112 to provide output current 122-2. This includes, at or around time T71, activating the switch 161 to an ON state.

As previously discussed, while the switch 161 is activated between time T71 and time T73, the controller 140 provides extra output current 122-2 to the load 118 via switching the switches Q1-Q4 as shown in FIG. 7. The switching of the switches Q1-Q4 between T71 and T72 as shown in graph 710 causes the power supply 100 to operate in a first mode of stepping up the output current 122-2 (to prevent the output voltage 123 from dropping further) and then ramping down a magnitude of the output current 122-2 through the secondary inductive path 152 to the dynamic load 118 between time T72 and T73 since the power converter 111-1 eventually is able to supply all of the output current required by the dynamic load 118 by time T73. Thus, the burst of output current 122-2 between time T71 and time T73 maintains a magnitude of the output voltage 123 during the transient current power consumption by the load 118.

At or around time T73, note that the power converter 112 no longer needs to be in an ON state to provide output current 122-2 to the dynamic load 118 because the power converter 111-1 provides a sufficient magnitude of the output current 122 to the dynamic load 118. Accordingly, the controller 140 deactivates the power converter 112 at or around time T73. This includes deactivating switch 161 and preventing flow of current 131 through the primary inductive path 151. As previously discussed, this prevents or terminates flow of output current 122-2. Current source 131 and corresponding switches are also deactivated.

Figure 8:
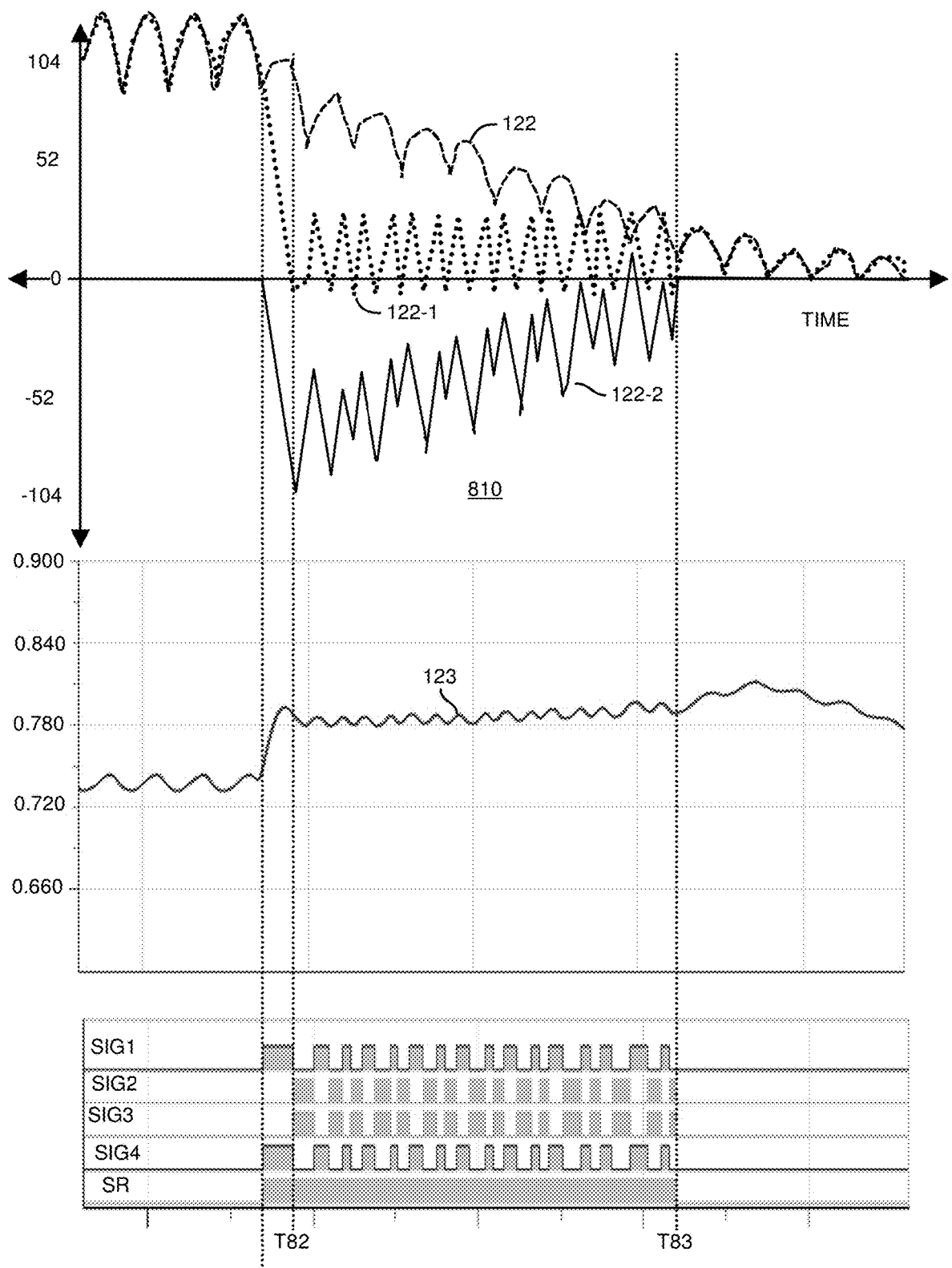
FIG. 8 is an example diagram illustrating a timing diagram of controlling multiple power converters to produce an output voltage and corresponding current flow according to embodiments herein.

FIG. 8 is an example diagram illustrating a timing diagram of controlling multiple power converters to produce an output voltage and corresponding current flow according to embodiments herein.

Simulation of an example of a transient step down event is shown in FIG. 8 based on the following parameters:
Istart of output current 122=112.5 A
Iend of output current 122=12.5 A All other parameters are the same as the step up case as previously discussed. The waveform (I_LLC) shows output current 122-1 of the 2Φ LLC (power converter 111-1) and its ramp down during the load change. The waveform (I_LS) is the reverse current (output current 122-2) injected by the i-Slope Booster (power converter 112) on the secondary side of the transformer 150. The output current 122-1 and output current 122-2 sum up together (I_out) to become the waveform as indicated by output current 122, which is the output current supplied to the dynamic load 118.

In this example embodiment, the graph 810 of FIG. 8 shows waveforms of signals during ramp down mode of output current 122-1. The top portion of graph 810 shows the various output currents supplied by the power converters to the dynamic load 118, the middle portion of graph 810 shows the output voltage waveform (output voltage 123), and the bottom portion of graph 810 shows the gate signals controlling respective switches in the power converters to produce respective output currents.

In this example embodiment, note that the output current 122-2 current from the i-Slope Booster (power converter 112) does not affect the output current 122-1 of the power converter 111-1 (such as LLC converter) since they are independent circuitry.

Further in this example embodiment, the power converter 112 is activated only during load change transitions when it is needed to maintain regulation of the output voltage 123. During steady state operation, such as when the conveyance of output current 122-1 from power converter 111 supplies sufficient current to the load 118 to maintain the output voltage 123 within regulation, only the power converter 111 is operational. This is shown in the periods before time T81 and after time T83 in graph 810.

Assume in this example embodiment that the dynamic load 118 experiences a sudden decrease in current consumption at or around time T81. This causes a magnitude of the output voltage 123 to increase substantially such as 30-40 millivolts or other amount within a short amount of time around time T81. As previously discussed, the controller 140 monitors and detects this condition (such as based on a magnitude of the output voltage 123, slope of the output voltage 123, etc.). In response to the sudden decrease in current consumption (or voltage step), the controller 140 activates the power converter 112. This includes, at or around time T81, activating the switch 161 to an ON state.

While the switch 161 is activated between time T81 and time T83, the controller 140 provides extra negative output current 122-2 to the load 118 via switching the switches Q1-Q4 as shown in FIG. 8. The switching of the switches Q1-Q4 between T81 and T83 causes the power supply 100 to operate in a mode of stepping down the output current 122-2 (to prevent the output voltage 123 from increasing further) between time T81 and T82 and then ramping up a magnitude of the output current 122-2 through the secondary inductive path 152 between time T82 and T83 to the dynamic load 118 since the power converter 111 eventually is able to supply the output current required by the dynamic load 118 by time T83. Thus, the burst of negative output current 122-2 between time T81 and time T83 maintains a magnitude of the output voltage 123 during the transient current power consumption by the load 118.

At or around time T83, the power converter 112 is no longer needed to provide negative output current 122-2 to the dynamic load 118. Accordingly, the controller 140 deactivates the power converter 112. This includes deactivating switch 161 and preventing flow of current 131 through the primary inductive path 151. As previously discussed, this prevents or terminates flow of output current 122-2.

Figure 9:
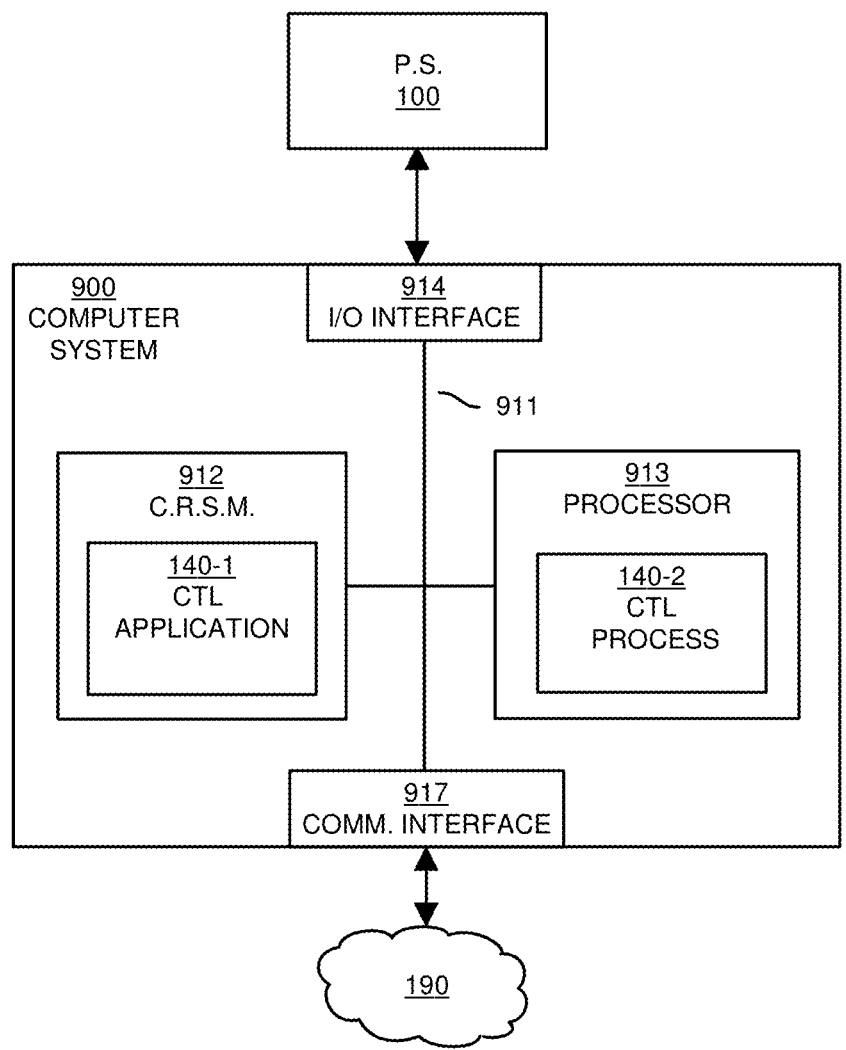
FIG. 9 is an example diagram illustrating example computer architecture operable to execute one or more methods according to embodiments herein.

FIG. 9 is an example diagram illustrating example computer architecture operable to execute one or more methods according to embodiments herein.

As previously discussed, any of the resources (such as controller 140, etc.) as discussed herein can be configured to include computer processor hardware and/or corresponding executable instructions to carry out the different operations as discussed herein.

As shown, computer system 900 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to external hardware 999 such as a keyboard, display screen, repository, etc.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with control application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in trim application 140-1 stored on computer readable storage medium 912. Execution of the control trim application 140-1 produces control process 140-2 to carry out any of the operations and/or processes as discussed herein.

Those skilled in the art will understand that the computer system 900 can include other processes and/or software and hardware components, such as an operating system that controls allocation and use of hardware resources to execute control application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 900 may reside at any location or can be included in any suitable resource in any network environment to implement functionality as discussed herein.

Figure 10:
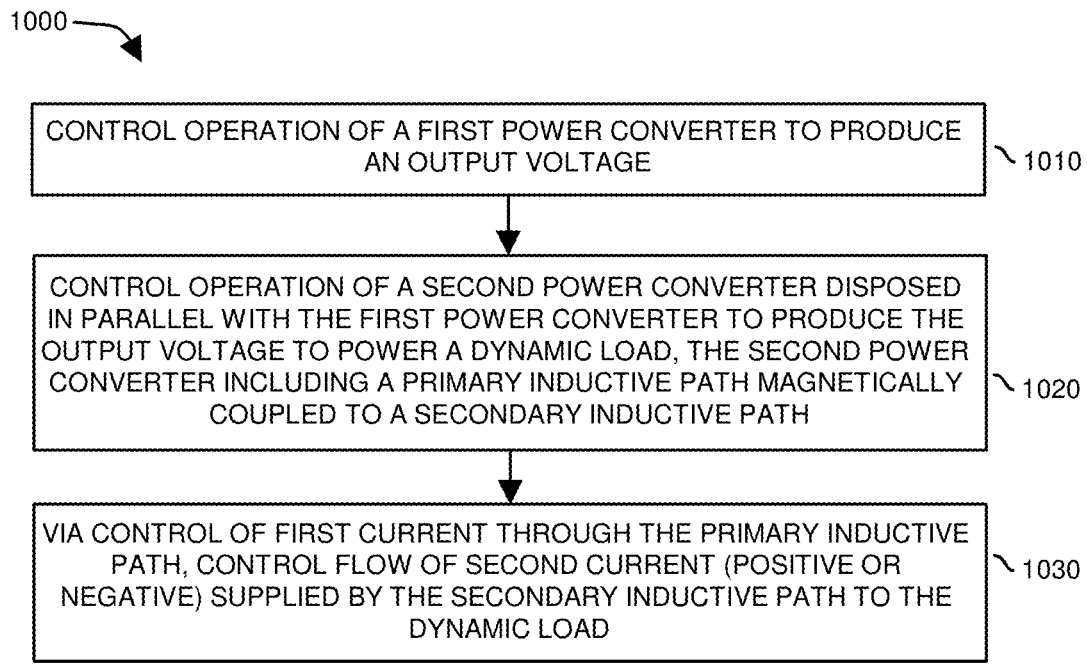
FIG. 10 is an example diagram illustrating a method according to embodiments herein.

Functionality supported by one or more resources as described herein are discussed via flowchart in FIG. 10. Note that the steps in the flowcharts below can be executed in any suitable order.

FIG. 10 is a flowchart 1000 illustrating an example method according to embodiments herein. Note that there will be some overlap with respect to concepts as discussed above.

In processing operation 1010, the controller 140 controls operation of a first power converter 111 to produce an output voltage 123.

In processing operation 1020, the controller 140 controls operation of a second power converter 112 disposed in parallel with the first power converter 111 to produce the output voltage 123 to power a dynamic load 118. The second power converter 112 includes a primary inductive path 151 magnetically coupled to a secondary inductive path 152.

In processing operation 1030, via control of first current 131 through the primary inductive path 151, the controller 140 controls flow of second current 122-2 supplied by the secondary inductive path 152 to the dynamic load 118.

Figure 11:
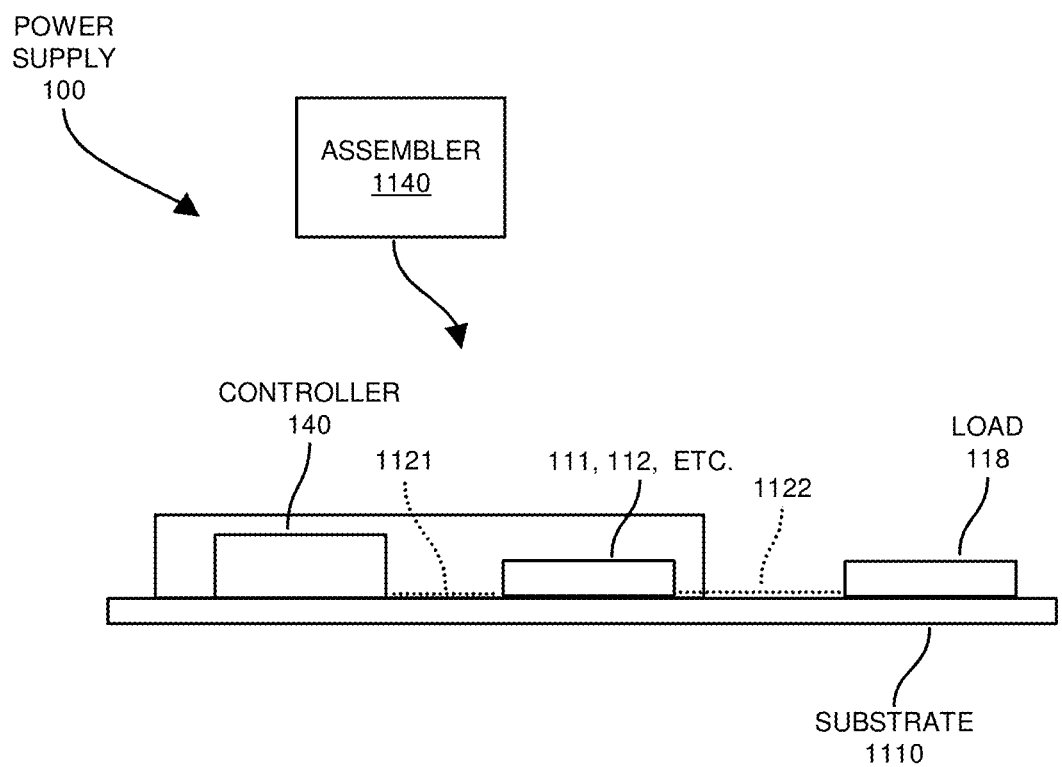
FIG. 11 is an example diagram illustrating fabrication of a respective assembly according to embodiments herein.

FIG. 11 is an example diagram illustrating assembly of a circuit board including a current monitor and power supply monitor according to embodiments herein.

In this example embodiment, assembler 1140 (a.k.a., fabricator) receives a substrate 1110 (such as a circuit board).

The assembler 1140 (fabricator) affixes (couples) the components of power supply 100 (such as including controller 140, power converter phase 111, power converter 112, etc.) to the substrate 1110. One or more circuit paths 1121 provide connectivity between the controller 140 and the power converter 111 and power converter 112.

Via one or more circuit paths 1122 (such as one or more traces, electrical conductors, cables, wires, etc.), the assembler 1140 or other suitable entity couples the power converters associated with the power supply 100 to the load 118. The one or more circuit paths convey respective output current 122-1 and 122-2 to the dynamic load 118.

Note that components associated with the power supply 100 such as the controller 140, power converters, etc., can be affixed or coupled to the substrate 1110 in any suitable manner. For example, each of the one or more of the components in power supply 100 can be soldered to the substrate, inserted into one or more respective sockets on the substrate 1110, etc.

Note further that the substrate 1110 is optional. If desired, the components of power supply 100 and corresponding circuit paths can be disposed in cables or other suitable resource.

Accordingly, embodiments herein include a system comprising: a substrate 1110 (such as a circuit board, standalone board, mother board, standalone board destined to be coupled to a mother board, host, etc.); a power supply 100 including corresponding components as described herein; and a load 118. As previously discussed, the load 118 is powered based on conveyance of the output voltage 123 and corresponding output current 122 over one or more paths 1122 as supplied by the power converters 111, 112, etc.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1110 or disposed at a remote location.

Note again that techniques herein are well suited for use in switching power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A power supply comprising:
a first power converter;
a second power converter disposed in parallel with the first power converter to produce an output voltage to power a dynamic load; and
the second power converter including a primary inductive path magnetically coupled to a secondary inductive path, a flow of first current through the primary inductive path controlling flow of second current supplied by the secondary inductive path to the dynamic load, the power supply further comprising:
a first switch coupled to the secondary inductive path;
a comparator operative to generate an error voltage based on a difference between the output voltage and a setpoint reference voltage; and
a controller operative to control a setting of the first switch based on the error voltage, the controlled setting of the first switch operative to control a magnitude of the second current.

2. The power supply as in claim 1, wherein the second power converter is disposed nearer the dynamic load than the first power converter.

3. The power supply as in claim 1, wherein the second power converter is deactivated to prevent flow of the second current through the secondary inductive path during non-transient dynamic load current consumption conditions; and wherein the second power converter is operative to increase a magnitude of the second current supplied to the dynamic load during transient current consumption conditions.

4. The power supply as in claim 1 further comprising:
a second switch operative to control delivery of a magnitude of the first current through the primary inductive path.

5. The power supply as in claim 4, wherein the controller is operable to control states of the first switch and the second switch based on the error voltage.

6. The power supply as in claim 1, wherein the first switch is a synchronous switch;
wherein the synchronous switch is operative to couple the secondary inductive path to a reference voltage, the power supply further comprising:
multiple switches coupled to the primary inductive path, the multiple switches operative to control a magnitude and direction of the first current through the primary inductive path.

7. The power supply as in claim 6 further comprising:
a controller operative to: i) control switching of switches in the first power converter at a first switching frequency, and ii) control switching of the multiple switches coupled to the primary inductive path at a second switching frequency to produce the output voltage, the second switching frequency greater than the first switching frequency.

8. The power supply as in claim 1 further comprising:
multiple switches coupled to the primary inductive path of the second power converter, wherein states of the multiple switches are operative to control a direction of the second current supplied through the secondary inductive path.

9. The power supply as in claim 1, wherein the first power converter is a buck converter.

10. The power supply as in claim 1, wherein the controller is further operative to:
prior to detection of a transient power consumption condition associated with the dynamic load, prevent the second current from flowing through the secondary inductive path; and
in response to detection of the transient power consumption condition associated with the dynamic load, temporarily increase a magnitude of the second current through the secondary inductive path.

11. The power supply as in claim 1, wherein
the controller is operable to switch between: i) operation of the power supply in a first mode in which the first power converter produces the output voltage while the first switch is deactivated to prevent the second current from flowing through the secondary inductive path to the dynamic load, and ii) operation of the power supply in a second mode in which the first power converter produces the output voltage while the first switch is activated to supply the second current through the primary inductive path to the dynamic load.

12. The power supply as in claim 1, wherein the controller is further operable to execute: i) a first mode of stepping up and then ramping down a setting of the second current through the secondary inductive path to produce the output voltage and accommodate a transient increase in current consumed by the dynamic load, and i) a second mode of stepping down and then ramping up a setting of the second current flow through the secondary inductive path to produce the output voltage and accommodate a transient decrease in current consumed by the dynamic load.

13. A system comprising:
a circuit board;
the power supply of claim 1, the second power converter fabricated on the circuit board.

14. A method comprising:
receiving a circuit board to which the dynamic load is affixed; and
fabricating the second power converter of claim 1 on the circuit board.

15. A method comprising:
controlling operation of a first power converter to produce an output voltage to power a dynamic load;
controlling operation of a second power converter to produce the output voltage to power the dynamic load, the second power converter disposed in parallel with the first power converter, the second power converter including a primary inductive path magnetically coupled to a secondary inductive path;
via control of first current through the primary inductive path, controlling flow of second current supplied by the secondary inductive path to the dynamic load; and
wherein controlling operation of the second power converter further includes: i) receiving an error voltage, the error voltage generated based on a difference between the output voltage and a setpoint reference voltage; and ii) controlling a setting of a first switch coupled to the secondary inductive path based on a magnitude of the error voltage, the setting of the first switch controlling a magnitude of the second current.

16. The method as in claim 15, wherein the second power converter is disposed nearer the dynamic load than the first power converter.

17. The method as in claim 15 further comprising:
deactivating the second power converter to prevent flow of the second current through the secondary inductive path during non-transient dynamic load current consumption conditions by the dynamic load; and
increasing a magnitude of the second current supplied by the secondary inductive path to the dynamic load during transient current consumption conditions by the dynamic load.

18. The method as in claim 15 further comprising:
via a second switch, controlling delivery of a magnitude of the first current through the primary inductive path.

19. The method as in claim 15 further comprising:
via the first switch coupled to the secondary inductive path, coupling the secondary inductive path to a reference voltage; and
via multiple switches coupled to the primary inductive path, controlling a magnitude and direction of the first current through the primary inductive path.

20. The method as in claim 19 further comprising:
i) controlling a rate of switching switches in the first power converter at a first switching frequency to produce the output voltage, and ii) controlling a rate of switching the multiple switches coupled to the primary inductive path in the second power converter at a second switching frequency to produce the output voltage, the second switching frequency greater than the first switching frequency.

21. The method as in claim 15 further comprising:
controlling a magnitude and direction of the second current based on the magnitude of the error voltage.

22. The method as in claim 15 further comprising:
controlling states of multiple switches coupled to the primary inductive path of the second power converter to control a direction of the second current supplied through the secondary inductive path.

23. The method as in claim 15, wherein the first power converter is a buck converter.

24. The method as in claim 15 further comprising:
prior to detection of a transient power consumption condition associated with the dynamic load, preventing the second current from flowing through the secondary inductive path to the dynamic load; and
in response to detection of the transient power consumption condition associated with the dynamic load, temporarily increasing a magnitude of the second current through the secondary inductive path to produce the output voltage.

25. The method as in claim 15 further comprising:
switching between: i) operation of the power supply in a first mode in which the first power converter produces the output voltage while the first switch in the second power converter is deactivated to prevent the second current from flowing through the secondary inductive path to the dynamic load, and ii) operation of the power supply in a second mode in which the first power converter produces the output voltage while the first switch is also activated to supply the second current through the primary inductive path to the dynamic load.

26. The method as in claim 15 further comprising:
executing: i) a first mode of stepping up and then ramping down a magnitude of the second current through the secondary inductive path to produce the output voltage and accommodate a transient increase in current consumed by the dynamic load, and ii) a second mode of stepping down and then ramping up a magnitude of the second current flow through the secondary inductive path to produce the output voltage and accommodate a transient decrease in current consumed by the dynamic load.

27. A method comprising:
controlling operation of a first power converter to produce an output voltage to power a dynamic load;
controlling operation of a second power converter to produce the output voltage to power the dynamic load, the second power converter disposed in parallel with the first power converter, the second power converter including a primary inductive path magnetically coupled to a secondary inductive path;
via control of first current through the primary inductive path, controlling flow of second current supplied by the secondary inductive path to the dynamic load;
via first switch circuitry, controlling a magnitude of the first current delivered through the primary inductive path;
via second switch circuitry, controlling delivery of the second current through the secondary inductive path; and
wherein states of the first switch circuitry and the second switch circuitry are controlled based on comparison of the output voltage to a desired setpoint voltage.

28. A power supply comprising:
a first power converter;
a second power converter disposed in parallel with the first power converter to produce an output voltage to power a dynamic load;
the second power converter including a primary inductive path magnetically coupled to a secondary inductive path, a flow of first current through the primary inductive path controlling flow of second current supplied by the secondary inductive path to the dynamic load, the power supply further comprising:

a first switch coupled to the secondary inductive path;

a comparator operative to generate an error current signal based on a difference between an output current supplied by the output voltage and a setpoint reference current value; and a controller operative to control a setting of the first switch and a magnitude of the second current based on the error current signal.

* * * * *